(12) United States Patent
Richter

(10) Patent No.: US 8,983,213 B1
(45) Date of Patent: Mar. 17, 2015

(54) IMAGE CODING AND DECODING METHODS AND APPARATUS

(75) Inventor: Thomas Richter, Stuttgart (DE)

(73) Assignee: Accusoft Corporation, Tampa, FL (US)

( * ) Notice: Subject to any disclaimer, the term of this patent is extended or adjusted under 35 U.S.C. 154(b) by 412 days.

(21) Appl. No.: 12/943,167

(22) Filed: Nov. 10, 2010

Related U.S. Application Data

(63) Continuation-in-part of application No. 12/902,307, filed on Oct. 12, 2010.

(60) Provisional application No. 61/378,079, filed on Aug. 30, 2010, provisional application No. 61/392,911, filed on Oct. 13, 2010.

(51) Int. Cl.
*G06K 9/36* (2006.01)

(52) U.S. Cl.
USPC .......................................................... 382/233

(58) Field of Classification Search
IPC ............... H04N 19/00781,19/00818, 19/00442, H04N 19/00121, 19/00418, 19/00424, 19/00563, H04N 19/00842, 7/26563, 7/26941, 19/0006, H04N 19/00309; G06T 9/40
See application file for complete search history.

(56) References Cited

U.S. PATENT DOCUMENTS

| | | | |
|---|---|---|---|
| 6,658,159 B1 | 12/2003 | Taubman | |
| 6,788,740 B1 * | 9/2004 | van der Schaar et al. | 375/240 |
| 6,980,597 B1 * | 12/2005 | Ling | 375/240.19 |
| 7,062,101 B2 * | 6/2006 | Schwartz | 382/248 |
| 7,263,235 B2 | 8/2007 | Kashina | |
| 7,373,007 B2 | 5/2008 | Sakuyama et al. | |
| 7,397,963 B2 * | 7/2008 | Schwartz | 382/248 |
| 7,577,308 B2 | 8/2009 | Sakuyama | |
| 2002/0003905 A1 * | 1/2002 | Sato et al. | 382/240 |
| 2002/0146177 A1 * | 10/2002 | Li et al. | 382/251 |
| 2003/0202711 A1 * | 10/2003 | Schwartz et al. | 382/247 |
| 2004/0022446 A1 * | 2/2004 | Taubman | 382/240 |
| 2005/0063599 A1 * | 3/2005 | Sato | 382/232 |
| 2005/0135683 A1 * | 6/2005 | Golla et al. | 382/232 |
| 2005/0175251 A1 * | 8/2005 | Taketa et al. | 382/248 |
| 2005/0204210 A1 * | 9/2005 | Lobo et al. | 714/701 |
| 2006/0140491 A1 * | 6/2006 | Schwartz | 382/232 |
| 2006/0222249 A1 * | 10/2006 | Hosaka et al. | 382/235 |
| 2006/0227877 A1 * | 10/2006 | Kadowaki | 375/240.24 |

(Continued)

OTHER PUBLICATIONS

JPEG 2000 Part I Final Committee Draft Version 1.0, ISO/IEC JTC 1/SC 291WG 1 N1646R, Mar. 16, 2000.

*Primary Examiner* — Jingge Wu
(74) *Attorney, Agent, or Firm* — Straub & Pokotylo; Michael P. Straub; Stephen T. Straub

(57) ABSTRACT

Methods and apparatus for coding and/or decoding bitplanes of individual codeblocks are described. Aspects relate to speeding up bitplane decoding when one or more decoders are used as part of the decoding process and one or more consistent value bitplanes were coded at the start of a codeblock. A number F, e.g., of consistent value, e.g., zero value, bitplanes are identified as corresponding to the beginning of an encoded codeblock being processed. Based on the determination a predetermined output, e.g., zero values corresponding to F bitplanes, is output. Thus, the output corresponding to the F consistent value bitplanes can be produced without having to perform a full arithmetic decoding process to generate the decoded data corresponding to the F consistent value bitplanes. Remaining bitplanes of a codeblock including data are subjected to decoding using one or more decoder modules which maybe part of a JPEG 2000 compliant decoder.

21 Claims, 8 Drawing Sheets

(56) References Cited

U.S. PATENT DOCUMENTS

| | | |
|---|---|---|
| 2008/0260275 A1 | 10/2008 | Ueno et al. |
| 2009/0074052 A1* | 3/2009 | Fukuhara et al. ........ 375/240.01 |
| 2009/0092326 A1* | 4/2009 | Fukuhara et al. ............. 382/233 |
| 2009/0119585 A1* | 5/2009 | Sakuyama et al. ............ 715/273 |
| 2009/0245384 A1* | 10/2009 | Fukuhara et al. ........ 375/240.24 |
| 2010/0092097 A1 | 4/2010 | Fukuhara et al. |
| 2010/0135587 A1* | 6/2010 | Watanabe et al. ............. 382/236 |
| 2010/0202705 A1* | 8/2010 | Fukuhara et al. ............. 382/218 |
| 2010/0254619 A1* | 10/2010 | Fukuhara et al. ............. 382/233 |
| 2011/0091123 A1* | 4/2011 | Fukuhara et al. ............. 382/248 |
| 2011/0206286 A1* | 8/2011 | Taketa et al. .................. 382/232 |

* cited by examiner

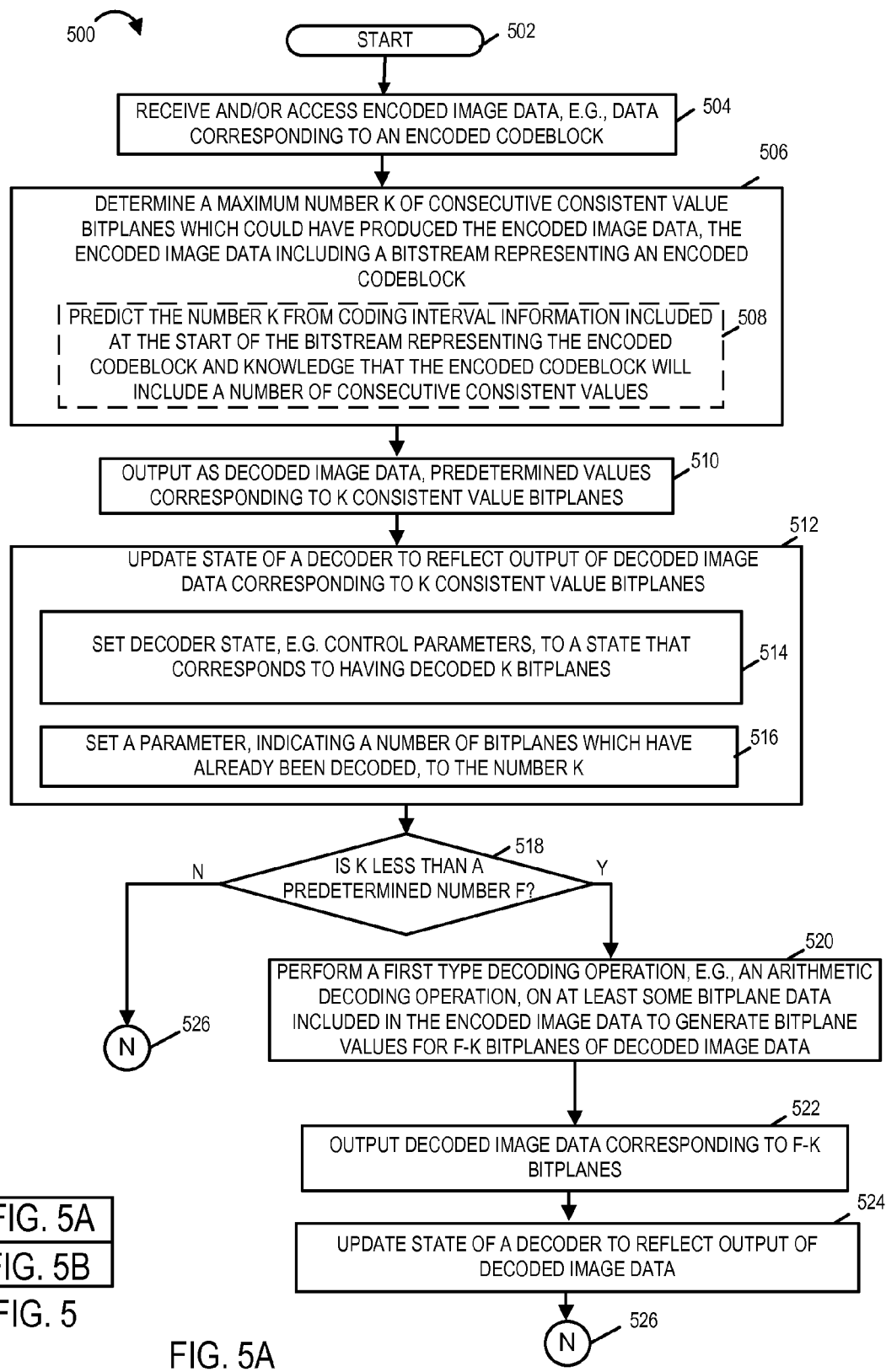

IMAGE CODING AND DECODING METHODS AND APPARATUS

RELATED APPLICATIONS

The present application claims the benefit of the filing date of U.S. Provisional Application Ser. No. 61/378,079, filed on Aug. 30, 2010 and the benefit of the filing date of U.S. Provisional Application Ser. No. 61/392, 911, filed on Oct. 13, 2010, and is a continuation-in-part of U.S. patent application Ser. No. 12/902, 307 filed on Oct. 12, 2010, entitled "IMAGE CODING AND DECODING METHODS AND APPARATUS", each of which is hereby expressly incorporated by reference in their entirety.

FIELD OF THE INVENTION

The present invention relates to coding and decoding methods and apparatus for performing bitplane coding and/or decoding and, more particularly, to methods and apparatus which may be used to speed up coding and/or decoding of bitplanes when one or more entropy coders are used as part of the coding process.

BACKGROUND

Bitplane based coding methods are used for coding a variety of types of data. The term bitplane is generally used to refer to a set of bits having the same position in the binary numbers of a set of data. For example, for a set of 8 bit data values there would be 8 bitplanes with each bit of a data value corresponding to a single corresponding one of the 8 bitplanes. The bitplane to which a bit in a data value corresponds is determined based on its position within the data value.

Bitplane coding has been applied to a wide variety of different types of data, e.g., audio data as well as image data.

Bitplane based coding methods often rely on entropy coding of the binary values which form a bitplane. One coding standard which uses bitplane coding is the JPEG 2000 standard.

JPEG 2000 (ISO/IEC 15444) is a recent standard of the ITU/ISO/IEC for compression of still images. A major obstacle in the widespread deployment and acceptance of JPEG 2000 is, however, its coding complexity. JPEG 2000 requires approximately ten times the computation time for compressing or decompressing an image than its predecessor, the JPEG standard (ISO/IEC 10918), did. While the coding scheme used in JPEG 2000 often results in better compression than the original JPEG standard, any methods for allowing JPEG 2000 compliant images to be generated by a coder in less time, even if it might reduce the achieved compression, would be desirable for many applications.

JPEG 2000 coders first run a wavelet transformation on the pixel levels of the image to be compressed, generating one or several so-called wavelet bands, each of which consists of wavelet-coefficients. In the lossy coding path, wavelet coefficients are quantized giving integer quantization indices which are then coded by the steps described below. In the lossless coding path, the wavelet transformation transforms integer pixel levels to integer wavelet coefficients without any loss and the integer coefficients are coded similar to the integer quantization indices in the lossy path. In both cases, the data v to be coded is represented as binary integers of N bits, consisting of a sign bit $s(v)=0; 1$ and N−1 magnitude bits $m_i(v)=0; 1$ coding the numerical value v as $$v = (-1)^{s(v)} \sum_{i=1}^{N-1} m_i(v) 2^{N-1-i}$$

The magnitude bits $m_i$ corresponding to the smaller i are called the most-significant bits or short MSBs, bits with higher indices are called the least significant bits, or short LSBs. The number of MSBs that are zero shall here be called the number of zero-bits, z, which is formally defined as:

$$z(v) := \max_i \{ m_j(v)=0 \text{ for all } j \leq i \},$$

where v is the wavelet coefficient represented in the binary sign-magnitude coding defined above. Due to the nature of natural images, most wavelet coefficients are rather small, and thus z (v) is typically large.

For coding, JPEG 2000 separates the wavelet coefficients or quantization indices into rectangular regions called codeblocks, denoted by C in the following. In the next step, the coder typically determines the number of zero-planes p(C) for each codeblock C, i.e. the number of MSBs that are zero for all coefficients within C. Formally:

$$P(C) := \min_{v \in C} z(v)$$

The collection of p(C) for all codeblocks is then coded by a so-called Tag Tree coding algorithm that is described in more detail in the JPEG 2000 standard and of no further interest for this document.

The remaining bits of all coefficients within a codeblock, i.e. bitplanes $i=p(C)+1$ and larger, are then coded by the so-called EBCOT-coder: all $$m_i(v) \text{ of } v \in C \text{ with } i > p(C)$$

are subject to this coding step. The EBCOT coder first re-orders the data m, into so-called bitplanes which are denoted as follows:

Bitplane number i of codeblock C, denoted by $b_i$, is the set of all magnitude bits m, (v) of all coefficients v in C. While $b_i$ consists entirely of zero bits for $i \leq p(C)$ by definition and thus do not require any further coding, this is not the case for $i > p(C)$; however, it is important to note that the EBCOT coding algorithm does not depend on this fact and is also able to code bitplanes b, that consist entirely of zero bits.

Each coefficient v of a bitplane $b_i$ is coded in exactly one out of three so-called coding passes defined in the JPEG 2000 standard; the order in which the data m, in b, is coded, and in which coding pass a coefficient is coded is also denoted in the standard and of no further relevance. However, it is important that the EBCOT coder has two options of coding the bits $b_i$ in bitplane i.

In the JPEG 2000 during normal standard mode of entropy coding, all bitplanes and all coding passes undergo so-called entropy coding by an arithmetic coder. This coder tries to represent the bits as compactly as possible employing the statistics of the data, but this entropy coding algorithm has a certain complexity that increases the overall complexity of the coding process; consequently, the complexity of the decoder is also high since it has to reverse these steps to reconstruct the data correctly.

In normal use of the so-called bypass mode of entropy coding of JPEG 2000 which can be signaled in the JPEG 2000 bitstream, only the first three bitplanes are coded as described above, i.e. $j=p(C)+1$ to $j=p(C)+3$ are coded as in the standard mode of entropy coding. All remaining bitplanes are coded partially bypassing the arithmetic coder: If a bit $b_i$ is coded in either the first or the second coding pass, the bit is directly written to the output bitstream bypassing the entropy coding process, only bits in the third coding pass are still entropy coded.

Since bypassing the entropy coder avoids its complexity, coding in the bypass mode is less complex and faster, but also tends to lower the coding efficiency measured as the average number of bits required to represent an image pixel. This is because bits are not represented as compactly as possible. The bypass coding mode is an option offered by the JPEG 2000 standard and available for all JPEG 2000 coders and decoders; it is relevant for understanding the nature of this invention.

While the bypass mode of JPEG 2000 provides the possibly of some speed up as compared to the standard mode of JPEG 2000, it still requires the coding of 3 bitplanes in accordance with the standard entropy coding method. Since entropy coding is normally rather computationally complex, the requirement that three bitplanes be entropy coded in the manner used in the standard mode tends to bottleneck in terms of the speed at which JPEG 2000 compliant coding can be performed. While modifying the JPEG 2000 standard to drop the requirement that 3 bitplanes be coded in accordance with the standard mode entropy coding process would be one way to speed up the coding processes, this would require a modification to the JPEG 2000 standard and a change to the JPEG 2000 decoders to support such an option.

The processing time required to code JPEG 2000 images on many processors, e.g., cell phone processors, etc. which operate at relatively low speed or have relatively little processing power, has delayed the wide spread use and acceptance of the JPEG 2000 standard as well as other bitplane based coding methods.

It should be appreciated that there is a need for finding ways to speed up the JPEG coding and/or decoding process and/or other bitplane coding processes to make them more widely acceptable. Such methods may be desirable for many applications even if the new methods result in a lower degree of compression.

In view of the above discussion, it should be appreciated that there is a need for new and improved bitplane processing methods including, e.g., coding and/or decoding methods.

SUMMARY

Figure 1:
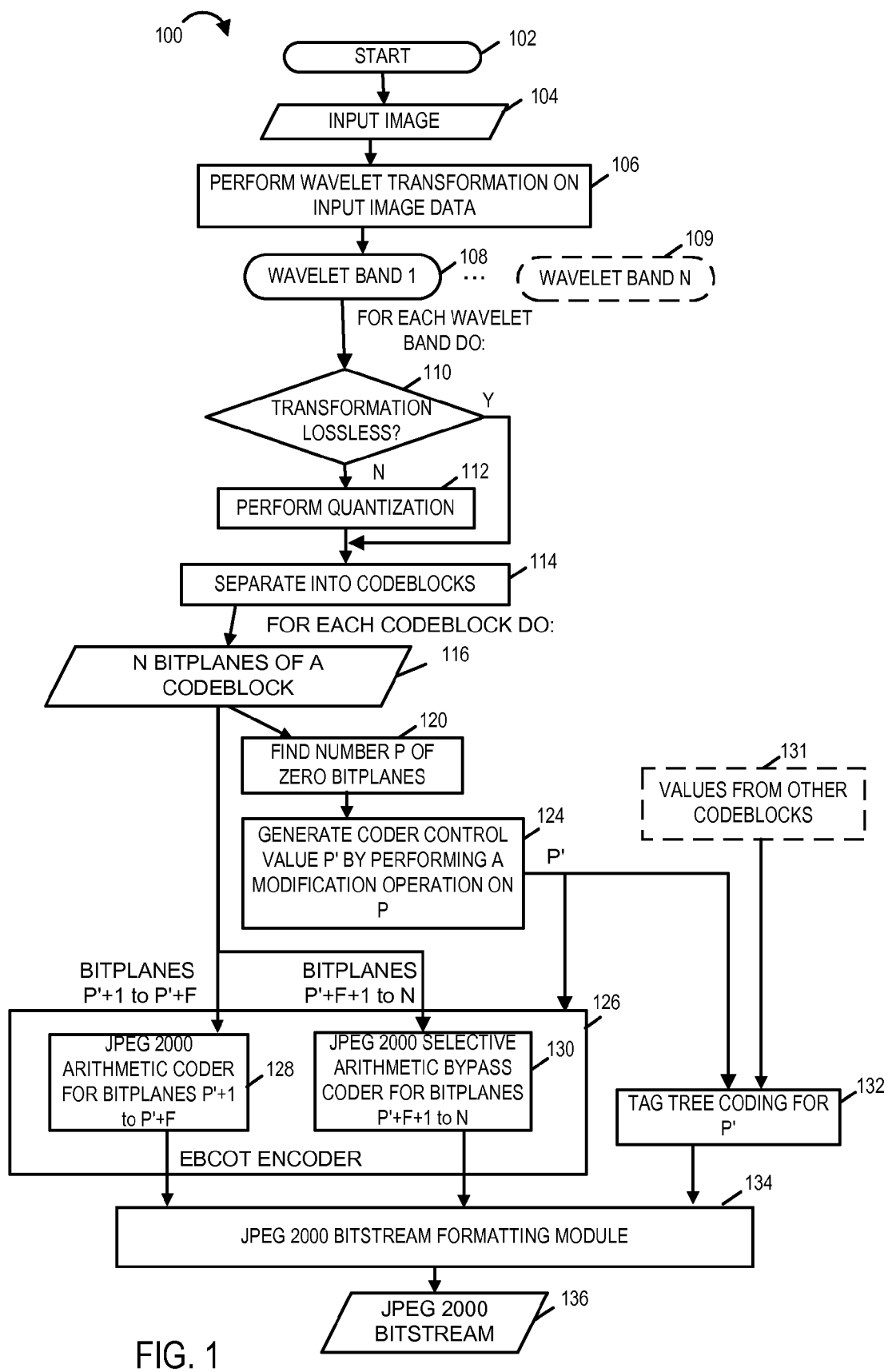
FIG. 1 illustrates an exemplary method, implemented in accordance with the invention, of generating a JPEG 2000 compliant bitstream.

Methods and apparatus for performing bitplane coding and/or decoding are described. Some embodiments are directed to decoding while other embodiments are directed to encoding. While an individual device may support both encoding and decoding in accordance with the invention, it should be appreciated that device which simply perform encoding and other devices which simply perform decoding in accordance with the invention are also contemplated and used in some embodiments.

In accordance with the invention consistent value bitplanes which are relatively easy to code using an entropy coder are subjected to a first coding process, e.g., an entropy coding process or a coding process which generates the output expected from entropy coding. The bitplanes may be zero value bitplanes where all the values of the bitplane are zero. Given that the values of the elements of the bitplane are the same, the consistent value bitplanes can be quickly coded using the first coding method. The coding method may be, and in some embodiments is, an arithmetic coding method.

The number of consistent value bitplanes which are subject to coding by the first method can be determined based on user input or under control of an application used to control the coding process. Where quick coding is desired, one or more consistent value bitplanes may be subject to the coding processes, e.g., one, two or three consistent value bitplanes. When maximum compression is desired, a user may indicate that zero consistent value bitplanes are to be subject to the first entropy coding method.

In an embodiment which generates a JPEG 2000 compliant coded data stream, the first coding method may use a JPEG 2000 arithmetic coder. In at least some JPEG 2000 embodiments the JPEG 2000 arithmetic coder processes three bitplanes, one or more of which are consistent value bitplanes in accordance with one embodiment. In at least some such embodiments consistent value (zero) bitplanes which would normally have not been subject to entropy coding if a conventional JPEG 2000 coding approach was employed, are subjected to entropy coding. Contrary to what one might assume, subjecting these additional bitplanes to entropy coding actually can speed up the coding process by allowing the bypass coding method to be employed to more non-consistent value bitplanes than would otherwise have been the case.

In accordance with the invention, non-consistent value bitplanes, e.g., bitplanes which include multiple different values, starting with those following the last bitplane subject to the first coding method, are coded using a second entropy coding method. In an embodiment which generates a JPEG 2000 compliant bitstream, the second coding method may uses a JPEG 2000 selective arithmetic bypass coder to code the non-consistent value bitplanes which were not subject to the first entropy coding method.

In accordance with one aspect of the invention, a predetermined number F of consistent value bitplanes, may be coded using the JPEG 2000 arithmetic coder. In some embodiments, for a standard JPEG 2000 coding the predetermined number F is 3. Because of the consistent value nature of these bitplanes, consistent value bitplanes code very quickly and a coded bitstream include F bitplanes coded by the JPEG 2000 arithmetic coder coding process can be generated more quickly than if the three bitplanes were non-consistent value bitplanes as is normally the case in a standard JPEG 2000 coding process.

One exemplary embodiment is directed to a method of coding bitplanes of data, comprising the steps of: determining a number P of consistent value bitplanes in a set of N bitplanes being coded, values in said P consistent value bitplanes being the same, P and N being integer values; performing a control value generation operation to generate a bitplane entropy coding control value P' from the number P; identifying, using the bitplane entropy coding control value P', a predetermined fixed number of bitplanes F of said set of N bitplanes; subjecting the identified bit planes to a first coding process to generate a first set of coded data and coding at least some remaining bitplanes of the set of N bitplanes using a second coding process to generate a second set of coded data. The second coding process being an entropy coding process different from said first coding process, said remaining bitplanes being bitplanes which were not subjected to the first coding process; and generating a bitstream from said first and second sets of entropy coded data and said value P', said bitstream communicating the value P'. In some embodiments the first coding process is a process which generates an output which is the same as that produced by a JPEG 2000 arithmetic coder. In some embodiments, a first coding module which is a JPEG 2000 arithmetic coder is used to implement the first coding process.

In some embodiments the method includes storing an output of said first coding process on a consistent value bitplane in a memory device prior to subjecting the identified bitplanes to a first coding process. In at least one such embodiment subjecting the identified bit planes to a first coding process includes outputting the stored output of said first coding process on a consistent value bitplane as at least some of said first set of coded data generated by said first coding process. As part of the first coding process, when the pre-computed output values are output, the first encoding process includes updating a state of a first coder module to a state corresponding to having performed an entropy coding operation on at least one consistent value bitplane. In some embodiments the output corresponds to a predetermined and stored output of coding k consistent value bitplanes and the first coder state is updated to reflect coding k consistent value bitplanes.

The bitstream generated by the coding methods described herein may be stored and/or transmitted. The generated bitstream may be a JPEG 2000 bitstream.

Following storage and/or transmission, in some embodiments, the coded data is decoded. In embodiments where the decoded data is image data, the decoded image data is displayed on a display device allowing an individual to view one or more images which were coded in accordance with the method of the invention.

The coding methods are not limited to being applied to image data and can be used to encode other types of data such as, for example, audio data.

A user of the coding method may vary the number of consistent value bitplanes subject to the first coding method based on the desired coding speed vs the amount of compression to be achieved.

While various aspects relate to coding embodiments, other embodiments and features relate to decoding. Various aspects allow for speeding up bitplane decoding when one or more decoders are used as part of the decoding process of the invention and one or more consistent value bitplanes were coded at the start of a codeblock.

Numerous additional features and embodiments are discussed in the detailed description which follows.

DETAILED DESCRIPTION

Methods and apparatus for performing bitplane coding and/or decoding are described. Various exemplary embodiments are directed to coding embodiments which generate a JPEG 2000 compliant bitstream. However, it should be appreciated that the methods and apparatus described herein are not limited to being applicable to JPEG 2000 and can be used in a variety of different coding applications.

A JPEG 2000 compliant bitstream generated in accordance with the exemplary coding method of the invention can be decoded by a JPEG 2000 compliant decoder. Thus a standard JPEG 2000 compliant decoder will be able to decode images coded by the modified coder described in this document. However, it should be noted that a decoder may detect that coding has been performed in accordance with the invention and output the predetermined values which will be generated from the coding of consistent value bitplanes in accordance with the invention. Accordingly, bitstreams generated in accordance with the JPEG 2000 coder embodiment can be decoded by a standard JPEG 2000 decoder, various embodiments are also directed to a novel decoder in which coding of consistent value bitplanes is detected and the predetermined decoded values corresponding to the coded value bitplanes is output without proceeding with computing the output values corresponding to the detected coded consistent value bitplanes each time an coded consistent value bitplane is detected.

The main source of complexity in JPEG 2000 is its entropy coding scheme. The entropy coding stage of the JPEG 2000 coding process codes transformed image coefficients bitplane by bitplane by using an arithmetic coder to perform the entropy coding. Even though the JPEG 2000 arithmetic coder is rather lightweight, it has to be run once per bitplane over the data to be coded, and thus its complexity is multiplied by the number of bitplanes. To avoid the full complexity of the standard entropy coding step with regard to at least some bitplanes, JPEG 2000 defines a mode of coding referred to as bypass mode coding within which parts of the bits in the bitplanes are not coded but rather copied directly into the output stream, thus avoiding the entropy coding step for at least some bits. Under default coding conditions, this bypass mode is, however, only activated for a subset of the bitplanes which normally follow three bitplanes which are subject to entropy coding using the arithmetic coder in the standard non-bypass manner. Thus the entropy coding step remains enabled for the first three bitplanes to be coded which are normally non-consistent value bitplanes.

This invention provides a standard-conforming modification of the coder that involves coding of consistent value bitplanes, e.g., in some embodiments, bitplanes including nothing but zero values, which can be coded quickly by an entropy coder. The coding of the consistent value bitplanes satisfies the JPEG 2000 requirement that three bitplanes be subject to entropy coding by the arithmetic coder before the bypass mode coding can be applied to one or more of the remaining bitplanes. The coding method described herein provides a speedup beyond that achieved by the standard use of the bypass mode since the data generated by the entropy coder on coding the consistent value bitplanes, e.g., zero or empty bitplanes, can be predetermined and stored in advance, it is sufficient to output this data and adjust the state of the entropy coder accordingly, instead of running the actual coding process. The generated coded bitstream remains JPEG 2000 compliant and can be decoded by any standard JPEG 2000 decoder.

The coding method has the advantage that it can also speed up decoding since entropy decoding of consistent value bitplanes can be performed quickly by a decoder, e.g., by outputting stored or known values which result from decoding a consistent value bitplane. Thus, the values to be output when a consistent value bitplane is being decoded need not be generated on the fly each time a consistent value bitplane needs to be decoded but rather, upon detection of a coded consistent value bitplane can be output quickly.

While the methods described herein can speed up coding and decoding, the methods may result in less compression since more bitplanes are subjected to the less efficient bypass coding than when entropy coding starts with the first non-consistent value bit plane. Hence, this invention may trade compression performance for speed. However, in many applications such a trade off can be desirable. In some embodiments it is up to a user or application controlling the coder to determine whether or not entropy coding of consistent value bitplanes in accordance with the invention is desirable and how many consistent value bitplanes should be subject to entropy coding.

The methods described herein allow an increased use of the JPEG 2000 coding bypass mode, e.g., it may be applied to more non-consistent value bitplanes than in the conventional coding approach. As already described above, the wavelet transformation is designed such that the wavelet coefficients of natural images are rather small, and thus the number of zero-planes P is usually large, often so large that the number of non-zero bitplanes i>P is small and the entropy coder bypass is rarely used, and the complexity reduction due to using the bypass mode remains small.

This invention now describes a modified coder that takes advantage of the JPEG 2000 bypass mode by increasing the number of bitplanes coded by bypassing the arithmetic coder. The approach can decrease the complexity of the overall coder. Since the coder described herein still produces a JPEG 2000 compliant bitstream, any JPEG 2000 conforming decoder can decode images coded according to this modification.

Within the coder of the present invention, the number of zero-bitplanes P is modified in the following way to generate P', a coder control value;

$$P'=\max(P-k,0)$$

where k is a speed up control value equal to or larger than zero. k may be a constant or a user or application supplied value. In some embodiments k is a value in the range of 0 to 3. Instead of P, P' is coded by the Tag Tree coder in JPEG 2000, and EBCOT coding starts at the first bitplane above bitplane P', namely at bitplane P'+1=p(C)−k+1 or, if that bitplane is not available, at bitplane 1.

The purpose of this modification is to use the entropy coding mode for bitplanes that are entirely zero and are hence coded rather quickly, and to use the bypass coding mode for more bitplanes than in the standard mode. For that note that for P≥k, bitplanes P'+1 through P'+k; that is the first k bitplanes to be coded consist only of zero bits due to the modification, and only the remaining bitplanes carry data. For k=3, these are the bitplanes that use the arithmetic coder, and remaining bitplanes, carrying also non-zero bits $m_i$ are coded in lower complexity bypassing the arithmetic coder for coding passes 1 and 2.

Since a standard conforming decoder is used in some embodiments to decode the number of zero-planes from the stream and start decoding at the first bitplane indicated by this number, it will start decoding at P'+1. This is in contrast to a normal JPEG 2000 decoding process where processing would normally have started at P+1. Since the coded bitstream is compliant with the JPEG 2000 standard, the decoder will reconstruct the bitplanes during decoding to exactly the same values the coder received as its input, including the additional planes containing only consistent values, e.g., zeros.

The control parameter k can be used to find a compromise between coding efficiency and coding complexity. k is normally in the range of 0 to 3. Larger values of k are possible but are not required to remain JPEG 2000 compliant. Note that k need not be transmitted or coded explicitly since the decoder uses the value P' for its operation, and this value is communicated as part of a standard JPEG 2000 compliant bitstream.

In cases where k corresponds to the number of consistent value (e.g., zero value) bitplanes to be coded since the contents of the first k bitplanes is known to the coder (e.g., they contain only zero bit values), the bitstream generated by feeding these bitplanes into the arithmetic coder is predictable. It is thus possible to instead of actually computing the output of the arithmetic coder each time a consistent value bitplane is to be coded to simply store the expected results and copy the known bit-pattern, in the bitstream being generated. The internal state of the first coder is then updated to the known state that occurs after coding a bitplane of zeros setting the first coder to the proper state for coding the next bitplane. This modification can, and in some embodiments is, used to reduce the complexity of the first coder since the arithmetic coder is one such embodiment where k=3 is only required for one of the three coding passes and the zero-planes do not require any computations to code. In one specific embodiment of the invention, the arithmetic coding computations are not performed on the consistent value bitplanes, but rather the output it would have generated is injected directly into the output bitstream and the state of the entropy coder is adjusted accordingly. In such embodiment the coder module produces the same output as would be generated by computing the arithmetic coder output in response to the input but without incurring the processing associated with such computations each time zero bitplane coding is to be performed. This procedure is possible since the input to the first coder is known in advance from the implementation and use of the value k, and the actual coding process need not to be run to determine what should be output. Since injecting bit patterns directly rather than running the entropy coder is a less complex operation, this embodiment of the invention offers reduced complexity as to embodiments which arithmetic computations are performed each time a zero bitplane is to be encoded.

Similarly, a decoder implemented in accordance with the invention can, and in some embodiments does, detect that the encoded data represents k zero bitplanes upfront, and then bypasses decoding the first k bitplanes by simply outputting the decoded values known to correspond to a coded zero value bitplane and adjusting the state of the arithmetic decoder accordingly. Detecting k zero bitplanes in an entropy coded bitstream can, and in some embodiments is, implemented by testing the size and the position of the coding interval of the arithmetic decoder. It should be noted that this process can be implemented much faster than actually performing a full decoding process of k bitplanes.

FIG. 1 is a flowchart 100 illustrating the steps 100 of an exemplary method of coding image data in accordance with one aspect of the invention which produces a JPEG 2000 compliant bitstream.

The exemplary method starts in step 102 in which the coder is initialized. The input image 104, e.g., in the form of pixel values, is received or retrieved from storage in step 104 and then subjected to a wavelet transformation in step 106. The wavelet transformation performed in step 106 may be a conventional wavelet transformation of the type specified in the JPEG 2000 standard. The wavelet transformation produces a plurality of wavelet bands 108, 109. In step 110 a determination is made as to whether the coding is to be lossless or lossy. This may be determined from user input and/or a coder setting. If lossy coding is to be performed quantization is performed on the coefficients of the wavelet bands in step 112 prior to separation of the coefficient values into codeblocks. However, if lossless coding is to be performed the quantization step is skipped and operation proceeds directly from step 110 to step 114. In step 114 the coefficients of the wavelet bands, e.g., quantized or unquantized coefficients depending on whether lossy or lossless coding is being performed, are separated into codeblocks. The processing proceeds from step 114 to steps 126 and 120 which are performed on a per codeblock basis. Thus, steps 120-134 will be performed for each codeblock, e.g., with the processing of the codeblocks being performed sequentially in some embodiments.

The N bitplanes of a codeblock 116, e.g., an ordered sequence of N biplanes of a codeblock, is the input to steps 120, 126. In step 120, the number P of consecutive consistent value, e.g., zero value, bitplanes in the sequence of bitplanes of the codeblock being processed is determined. The number P is determined starting from a predetermined end of the bitplane sequence.

The value P is then used in step 124 to generate a coder control value P'. The generation of the value P', in one embodiment, is performed by subjecting the value P to a modification operation where:

$$P'=\max(P-k,0)$$

where k is a speed up control value and is a non-negative integer.

The value P' is supplied to the JPEG 2000 compliant EBCOT coder module 126 responsible for performing JPEG 2000 entropy coding and also to the Tag Tree Coding module 132. The tag tree coding module 132 codes one or multiple values P' in common, corresponding to one or multiple codeblocks. In accordance with the invention, bitplanes P'+1 to P'+F are subject to coding using a JPEG 2000 arithmetic coder while bitplanes P'+F+1 to N are subjected to entropy coding using a JPEG 2000 selective arithmetic bypass coder 130. While bitplanes P'+F+1 to N are subject to entropy coding in some embodiments, in other embodiments encoding stops before all bitplanes have been coded. The coder control value P' is shown being supplied to the EBCOT coder 126 and is used to indicate which bitplanes are to be subjected to processing by the JPEG 2000 arithmetic coder and which bitplanes are to be subject to coding by the JPEG 2000 selective arithmetic bypass coder. Thus, in the FIG. 1 embodiment bitplanes P'+1 to P'+F are subject to JPEG 2000 arithmetic coding and bitplanes P'+F+1 to N are subject to JPEG 2000 selective arithmetic bypass coding with the bits generated by these coding processes being incorporated into a JPEG 2000 bitstream by the JPEG 2000 bitstream formatting module 134. Bitplanes 1 to P' are consistent value bitplanes, e.g., bitplanes which are all zeros, and need not be individually entropy coded. The tag tee coding 132 generates information ' communicating the value P' into which is supplied to the bitstream formatting module 134 for inclusion in the generated JPEG 2000 compliant bitstream 136. The tag tree coding may be used to code the values for multiple codeblocks. The bitstream 136 is stored on a storage device and/or transmitted. In addition it may be decoded and displayed. A user or application using the coder can select the speed up control value k based on the coding results, e.g., the rate at which coding occurs and/or the compression achieved. Thus, in some embodiments the value k is changed from coding one image to the next. The process shown in FIG. 1 may, and in some embodiments is, repeated multiple times for different images.

As discussed above, in one embodiment the JPEG arithmetic coder 128 need not compute the values to be included in the bitstream each time a zero bitplane is to be coded. Instead, in at least some embodiments it detects when a zero bitplane is to be coded and outputs a predetermined set of bits representing the known, e.g., predetermined, result of entropy coding a zero bitplane in a JPEG 2000 compliant manner. In some embodiments the known result may be stored in memory and output as needed. Entropy coder state may be updated to indicate the coding of a zero bitplane as the known coding result is output. Thus, in at least one such embodiment, coding of zero bitplanes becomes a straight forward process requiring very few operations by the JPEG 2000 arithmetic coder 128. This process had very low complexity.

Figure 2:
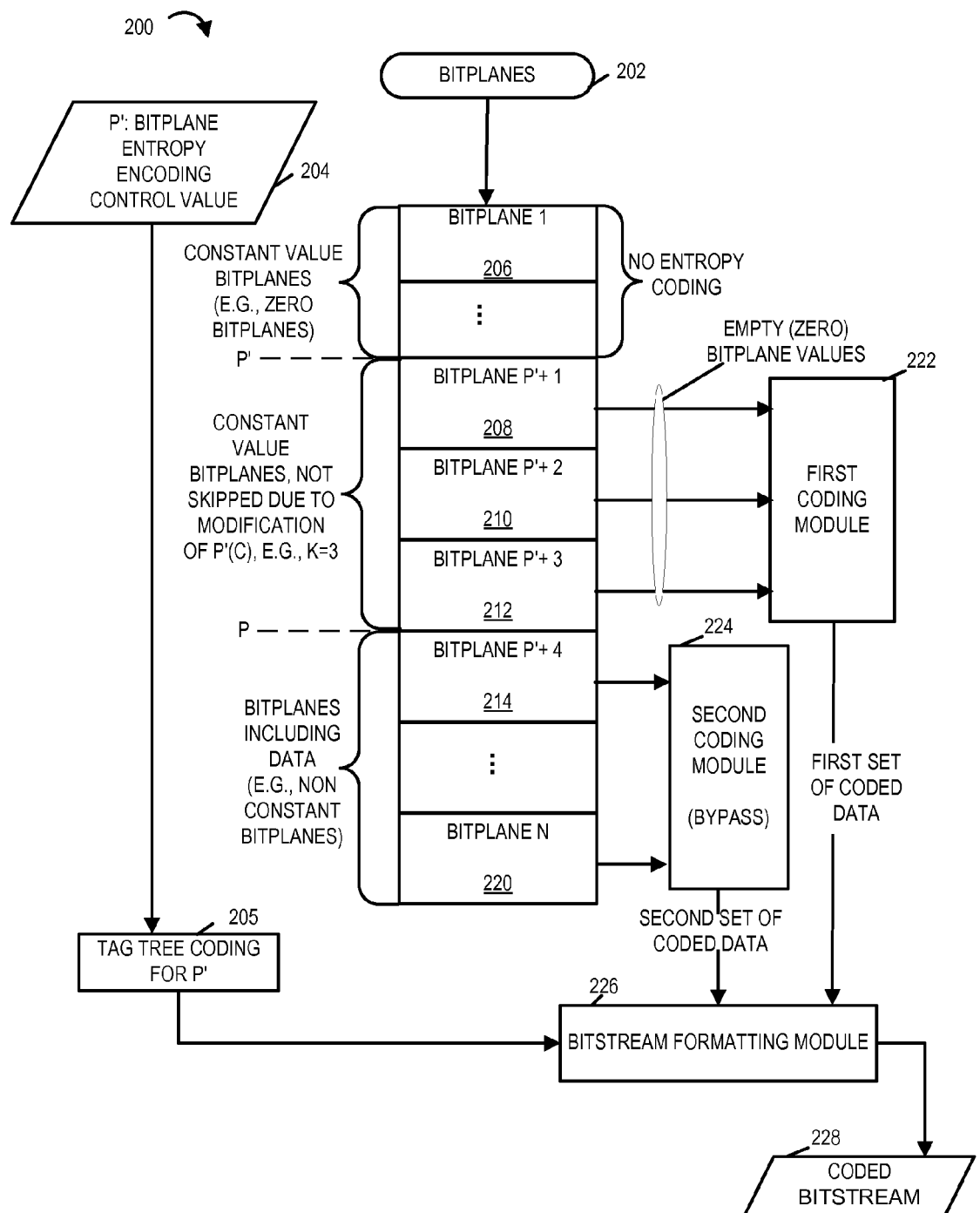
FIG. 2 illustrates the processing and coding of bitplanes of a codeblock of image data in one exemplary embodiment in which the method of FIG. 1 is used.

FIG. 2 is a diagram 200 illustrating coding of a set of N bitplanes of a codeblock in accordance with the invention where the coder speed up control value k has been set to 3 and the predetermines number F is also 3. The process 200 is repeated for each codeblock of an image being coded. The ordered set of bitplanes 202 includes bitplanes 1 206 to bitplane N 220. Also illustrated and included in the set of N bitplanes is bitplane P'+1 208, bitplane P'+2 210, bitplane P'+3 212 and bitplane P'+4 214. The entropy coding control value P' 204 generated in accordance with the invention is used to control the coding and is also supplied to bitplane formatting module 226 which includes the value P' or information indicating the value P' in the generated coded bitstream. As shown in FIG. 2, consistent value bitplanes 1 to P' are not entropy coded with their existence being communicated by the information indicating the value P' included in the bitstream formatting module. The three consistent value bitplanes 208, 210, 212 corresponding to bitplanes P'+1 to P'+3, e.g., bitplanes where all values are zero, are supplied to a first entropy coding module 222. The first entropy coding module 222, in some embodiments is a JPEG 2000 compliant arithmetic coder. Bitplanes P'+4 to N are supplied to the second entropy coding module 224 and subject to the second entropy coding process. In some embodiments the second entropy coding module 224 is a JPEG 2000 selective arithmetic bypass coder. While shown as separate physical modules, it should be appreciated that module 222 and module 224 may, in some embodiments, share some hardware which is reused depending on the type of coding being performed at a particular point in time.

The coded bits generated by the coding of bitplanes P'+1 to P'+3 is supplied by the first entropy coding module 222 and the coded bits generated by the second entropy coding module 224 from bitplanes P'+4 to N are supplied to the bitstream formatting module 226 which includes the coded bits in a bitstream formatted in compliance with the coding standard being complied with, e.g., the JPEG 2000 coding standard in some embodiments.

The coded bitstream 228, e.g., a JPEG 2000 compliant bitstream in some embodiments, is output by the bitstream formatting module 226 for storage, transmission and ultimately decoding and display.

Figure 3:
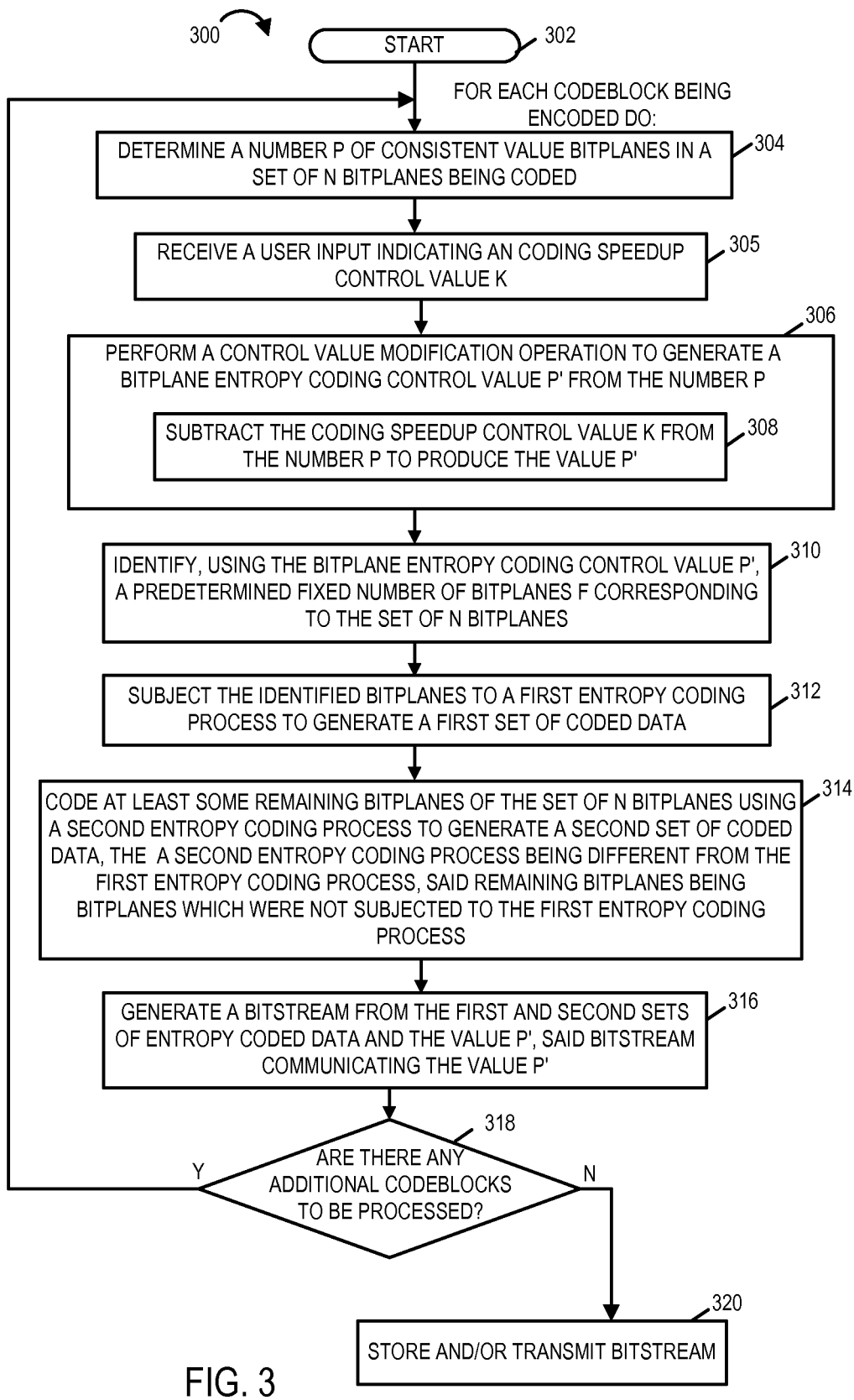
FIG. 3 illustrates an exemplary method, implemented in accordance with the invention, of coding bitplanes of data.

FIG. 3 illustrates the steps of a bitplane based coding method 300 implemented in accordance with the invention. While the FIG. 1 embodiment was explained in the context of a JPEG 2000 exemplary implementation, the FIG. 3 embodiment shows an implementation which is applicable to a wide variety of bitplane coding applications.

The coding method 300 starts in step 302 with the coding process being initialized. The processing following initialization step 302 is performed for each codeblock being coded with the codeblock being represented by multiple, e.g., N, bitplanes of data. At the start of processing in step 304 a number of P consistent value bits which occur consecutively in the ordered set of N bitplanes is determined. A speedup control value K is received in step 305. The receipt of the value K in step 305 is optional. the control value k may be preset or set by the user or an application for a period of time.

In step 306, a control value modification operation is performed on the determined value P to generate a bitplane entropy coding control value P'. The modification operation, in some embodiments, involves subtracting the coding speedup control value K from the number P to produce the value P', with the value P' being set to zero in the case where P−K would produce a negative value.

With the coding control value P' having been generated in step 306 operation proceeds to step 310 where a predetermined number F of bitplanes corresponding to the set of N bitplanes is identified. For example, the F identified bitplanes may be bitplanes P'+1 to P'+F in the set of N bitplanes. F may be a predetermined positive integer number based on the standard being implemented. In the case of JPEG 2000 F is 3.

In step 312, the F bitplanes identified in step 310 are subject to a first entropy coding process to generate a first set of coded data. Then in steps 314 at least some remaining bitplanes of the set of N bitplanes are coded using a second entropy coding process to generate a second set of coded data. The second entropy coding process is different from the first entropy coding process, e.g., it may be bypass coding process such as the one supported in JPEG 2000. The at least some remaining bitplanes which are coded in step 314 are bitplanes which were not subjected to the first entropy coding process, e.g., bitplanes P'+K+1 through N.

The first and second sets of data are processed along with the value P' to generate a bitstream communicating the first and second sets of coded data and the value P'. The value P' may be communicated explicitly as an coded value or implicitly in the information communicated as part of the generated bitstream. Step 314 may include formatting, adding headers and/or otherwise arranging the coded data and/or other information generated by the coding method into a bitstream which can be stored and/or transmitted. The formatting and/or heading information included in the bitstream allow the coded data to be interpreted and decoded at a later time.

With the encoding of one codeblock having been completed in step 316, a check is made in step 318 to determine if any other codeblocks remain to be processed. If there are one or more additional codeblocks to be coded, operation returns to step 304 where the next codeblock begins being processed. If there are no more codeblocks to be processed operation proceeds from step 318 to step 320 in which the generated bitstream is stored and/or transmitted.

Figure 4:
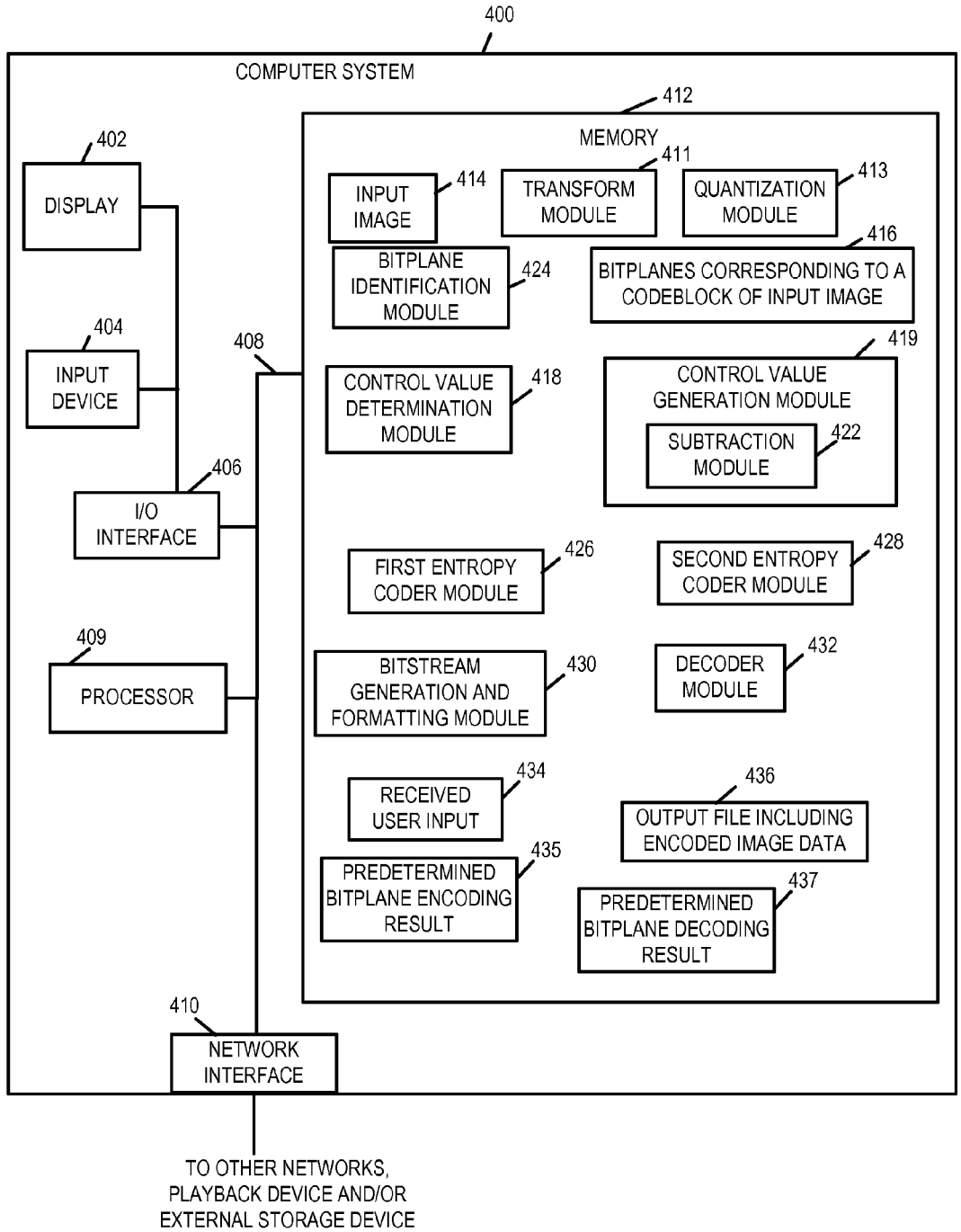
FIG. 4 illustrates a computer system implemented in accordance with the invention which can perform the coding methods shown in either of FIG. 1 and FIG. 3.

FIG. 4 illustrates an apparatus, e.g., a computer system 400, capable of coding and decoding data, e.g., image data, in accordance with the present invention. The system 400 includes various modules for performing the steps of the method shown in FIG. 1, it also stores, in some embodiments, both the uncoded image data and coded image data.

As shown in FIG. 4, the computer system 400 includes a display 402, an input device 404, an input/output interface 406, a processor 409 a network interface 410 and a memory 412 coupled together by a bus 404. The display 402 can be use to display input images, images generated by decoding image data coded in accordance with the invention and for displaying one or more coding control screens which may display coder related information, e.g., user selected control parameters and information about the coding rate and compression rate achieved using a particular speed up coding control parameter. The user can input control parameters using the input device 404 which may be, e.g., a keyboard or other input device. The processor performs coding in accordance with the invention, e.g., under direction of one or more of the modules stored in memory 412. While the memory 412 includes various software modules, the modules may and in some embodiments are, implemented in hardware.

The method 412 includes input image data 414 to be coded. The input image data may be pixel values and/or wavelet transformed quantized image data, in the form of bitplanes 416 corresponding to one or more codeblocks are generated by processing pixel values using the transform module 411 and quantization module 413. The transform module 411 may perform a wavelet transform module such as the transformation performed in step 106 shown in FIG. 1 to produce coefficient values which are then quantized by module 415. In addition to the modules 411, 413, the memory 400 includes a determination module 418 for determining a number P of consistent value bitplanes in a set of N bitplanes being coded, values in said P consistent value bitplanes being the same, P and N being integer values, a control value generation module 419 for generating a bitplane entropy coding control value P' from the number P; a bitplane identification module 421 for identifying, using the bitplane entropy coding control value P', a predetermined fixed number of bitplanes F of said set of N bitplanes, a first entropy coder module 426 for subjecting the identified bit planes to a first entropy coding process to generate a first set of coded data; a second entropy coder module 428 for coding at least some remaining bitplanes of the set of N bitplanes using a second entropy coding process to generate a second set of coded data, the second entropy coding process being different from said first entropy coding process, said remaining bitplanes being bitplanes which were not subjected to the first entropy coding process; and a bitstream generation module 430, which may also perform bitstream formatting, for generating a bitstream from said first and second sets of entropy coded data and said value P', said bitstream communicating the value P'. The system may also include a decoder module 432 for decoding bitstreams generated in accordance with the invention. The control value generation module 419 includes a subtraction module 422 which in some embodiments is used to subtract k from the value P to generate the value P'. The control value generation module may limit the coder control value P' to zero when the subtraction results in a negative result.

User input 434, e.g., the control value k, may be stored and used as needed. In addition the memory may include a predetermined coding result 435 which is the expected result of coding a zero bitplane. In some embodiments the predetermined result 435 is used as the output of the first entropy coder when one or more consistent value (zero value) bitplanes is coded.

The memory may, and in some embodiments does, also include a predetermined decoding result 437 which is the expected result of decoding one or more consistent value (zero) bitplanes. In some embodiments the predetermined result 435 is used as the output of the first entropy coder when one or more zero bitplane are to be decoded. The storage and output of predetermined, e.g., previously generated, coding and/or decoding results allows for fast coding/decoding of zero, e.g., non-data, bitplanes. The output image file 436 includes coded image data which is the output at the completion of coding performed in accordance with the invention.

The bitstream generated and stored in the output file may be a JPEG 2000 compliant bitstream.

While the coder of the invention can be implemented completely in hardware, some embodiments are directed a non-transitory computer readable medium embodying a set of software instructions, e.g., computer executable instructions, for controlling a computer or other device to code and store an image in accordance with the present invention. The coded image may, and in some embodiments is, decoded and displayed. In other embodiments the set of coded image data generated in accordance with the invention is stored and/or stored and then transmitted for decoding and display.

Figure 5B:
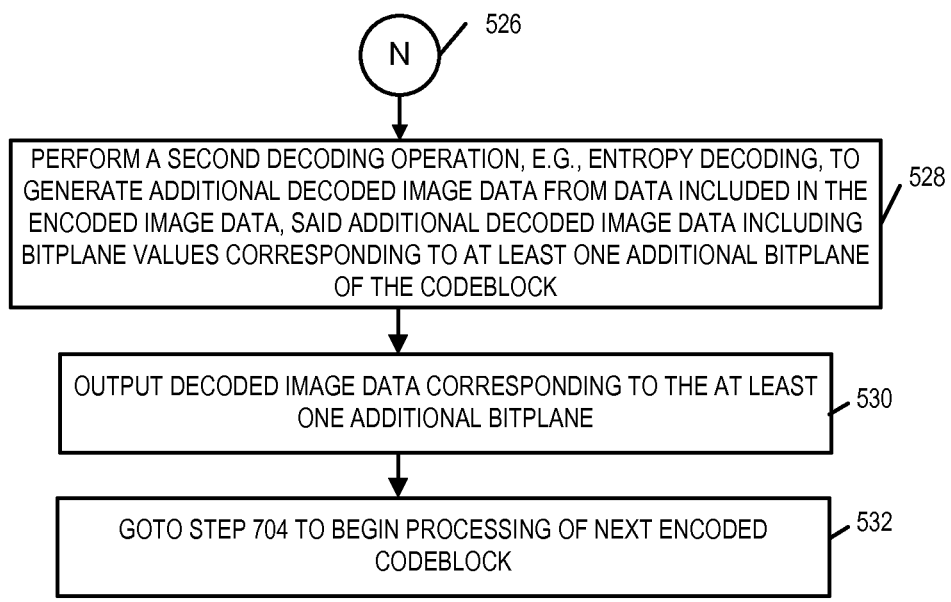
FIG. 5, which comprises the combination of FIGS. 5A and 5B, illustrates an exemplary decoding method for decoding encoded image data, e.g., image data corresponding to one or more codeblocks, in accordance with one exemplary embodiment of the invention.

FIG. 5 which comprises the combination of FIGS. 5A and 5B is a flowchart 500 illustrating an exemplary method of decoding encoded image data, in accordance with one exemplary embodiment of the invention. The exemplary decoding method 500 starts in step 502 with the decoding process being initialized. The processing following initialization step 502 is performed for each codelock for which encoded image data has been included in the bitstream, e.g., each codeblock which is not all zeros. Individual codeblocks decoded via the method shown in FIG. 5 include N, bitplanes of data where N is a non-zero value and where N is normally greater than 1. Codeblocks which are not coded, e.g., because they are all zeros, can skip the decoding shown in FIG. 5 with the appropriate zero codeblock being produced, e.g., when a final decoded output set of image data is produced, without the need to perform arithmetic decoding for the encoded codeblock.

In step 504 encoded image data is received and/or accessed, e.g., from memory where it could have been temporarily stored prior to decoding. The encoded image data is, e.g., data corresponding to an encoded codeblock. In some embodiments the encoded image data is JPEG-2000 compliant encoded image data. Operation proceeds from step 504 to step 506. In step 506 a maximum number "K" of consecutive consistent value bitplanes which could have produced the encoded image data, is determined, K being an integer value. In various embodiments the consistent value bitplanes are bitplanes where all the values in the bitplane are zero. In some embodiments the encoded image data includes a bitstream representing an encoded codeblock. For the purpose of discussion of the example illustrated in FIG. 5 consider that the encoded image data includes a bitstream representing an encoded codeblock. In some embodiments performing step 506 includes performing step 508 which is one way of determining the maximum number K of consecutive consistent value bitplanes as shown in step 506. However the determination regarding the number K can be made in other ways as well. In step 508 the number K is predicted from coding interval information included at the start of the bitstream representing the encoded codeblock, and knowledge that the encoded codeblock will include one of a limited number of possible consecutive consistent value bitplanes at the start of the block, e.g., 0, 1, 2, or 3. In some embodiments the predicting is further based on knowledge that arithmetic coding was used to produce the encoded image data which is being processed for decoding. The number of possibilities which are considered for K may be limited to a predetermined number of possible values, e.g., 0, 1, 2 and 3 in some embodiments. In other embodiments K may simply be limited to two possibilities, e.g., 0 or 3. Given the limited number of possible values for K it is often easy to determine which possible value of K the received encoded data corresponds to than it would be to perform a complete arithmetic decoding operation for the first K bitplanes if they corresponded to unknown values. In some embodiments step 506 of determining a maximum number K of consecutive consistent value bitplanes which could have produced the encoded image data includes determining from the start of the encoded image data a number Z of consistent value bits said encoded image data would decode to and determining said number K as follows: K=floor (Z/C), where C is the integer number of bits required to encode a consistent value bitplane, and floor is a function which provides the largest integer number smaller or equal to its argument.

Operation proceeds from step 506 to 510. In step 510 predetermined values corresponding to K consistent value bitplanes are output as decoded image data. In some embodiments the predetermined values are zero values. Operation proceeds from step 510 to step 512. In step 512 a decoder state is updated to reflect the output of decoded image data corresponding to K consistent value bitplanes. In some embodiments updating the state of a decoder includes performing steps 514 and 516. In step 512 decoder state, e.g., one or more decoder control parameters, is updated to a state which corresponds to having decoded the K consistent value bitplanes. That is, the state of the decoder is updated to a state corresponding to having decoded K bitplanes. In step 516 a parameter, indicating a number of bitplanes which have already been decoded, is set to the number K. This way the decoder would keeps track of how many bitplanes have been decoded and which bitplane should be decoded next.

Operation proceeds from step 512 to step 518. In step 518 a determination is made to determine whether the number K is less than a predetermined number "F". In some embodiments the predetermined number F is 3. If K is less than the predetermined number F, the operation proceeds from step 518 to step 520. If however it is determined that K is not less than the predetermined number F, the operation proceeds from step 518 to step 528 via connecting node N 526. In step 520 a first type decoding operation is performed, e.g., using a first decoder, on at least some bitplane data included in the encoded image data to generate bitplane values for F−K bitplanes of decoded image data. In some embodiments the first decoder implementing the first type decoding operation is an arithmetic decoder, and the performing first type decoding operation includes performing an arithmetic decoding operation. Thus when the determined, e.g., predicted, number K is less than the predetermined number F, then at least some bitplanes included in the encoded image data are decoded using, e.g., an arithmetic decoder, to produce bitplane values for F−K bitplanes of decoded image data.

Operation proceeds from step 520 to step 522 wherein decoded image data corresponding to the F−K bitplanes is output, e.g., as a result of the first type decoding operation. The operation proceeds from step 522 to step 524. In step 524 a decoder state is updated to reflect output of decoded image data. It should be appreciated that in some embodiments the state of a decoder is updated following the output of decoded image data, so that the decoder can be controlled to move on to decode the next set of bitplanes included in the codeblock being processed. Operation proceeds from step 524 to step 528 via connecting node N 526 as shown in FIGS. 5A and 5B.

Returning now to step 528. In step 528 a second decoding operation is performed to generate additional decoded image data from data included in the encoded image data, said additional decoded image data including bitplane values corresponding to at least one additional bitplane of the codeblock being processed by the method shown in FIG. 5. Thus using the second decoding operation at least some additional decoded image data including bitplane values corresponding to at least one additional bitplane of the codeblock is produced. In some embodiments the second type decoding operation is an entropy decoding operation. In some embodiments the decoded image data includes a set of bitplane values for each of a plurality of different bitplanes of a JPEG 2000 codeblock. In some embodiments the second type decoding operation is, implemented using a JPEG 2000 compliant selective arithmetic bypass decoding process. In some embodiments the first type decoding operation is a JPEG 2000 arithmetic decoding operation. It should be appreciated that some image additional image data is normally generated for some codeblocks of an image, in very low bit rate encoding it is possible that additional bitplane data may not be included for one or more codeblocks of an image.

Operation proceeds from step 528 to step 530. In step 530 the additional decoded image data corresponding to the at least one additional bitplane of the codeblock is output. Operation proceeds from step 530 to step 532 where the operation is controlled to proceed back to step 504 to begin processing of the next encoded codeblock.

Figure 6:
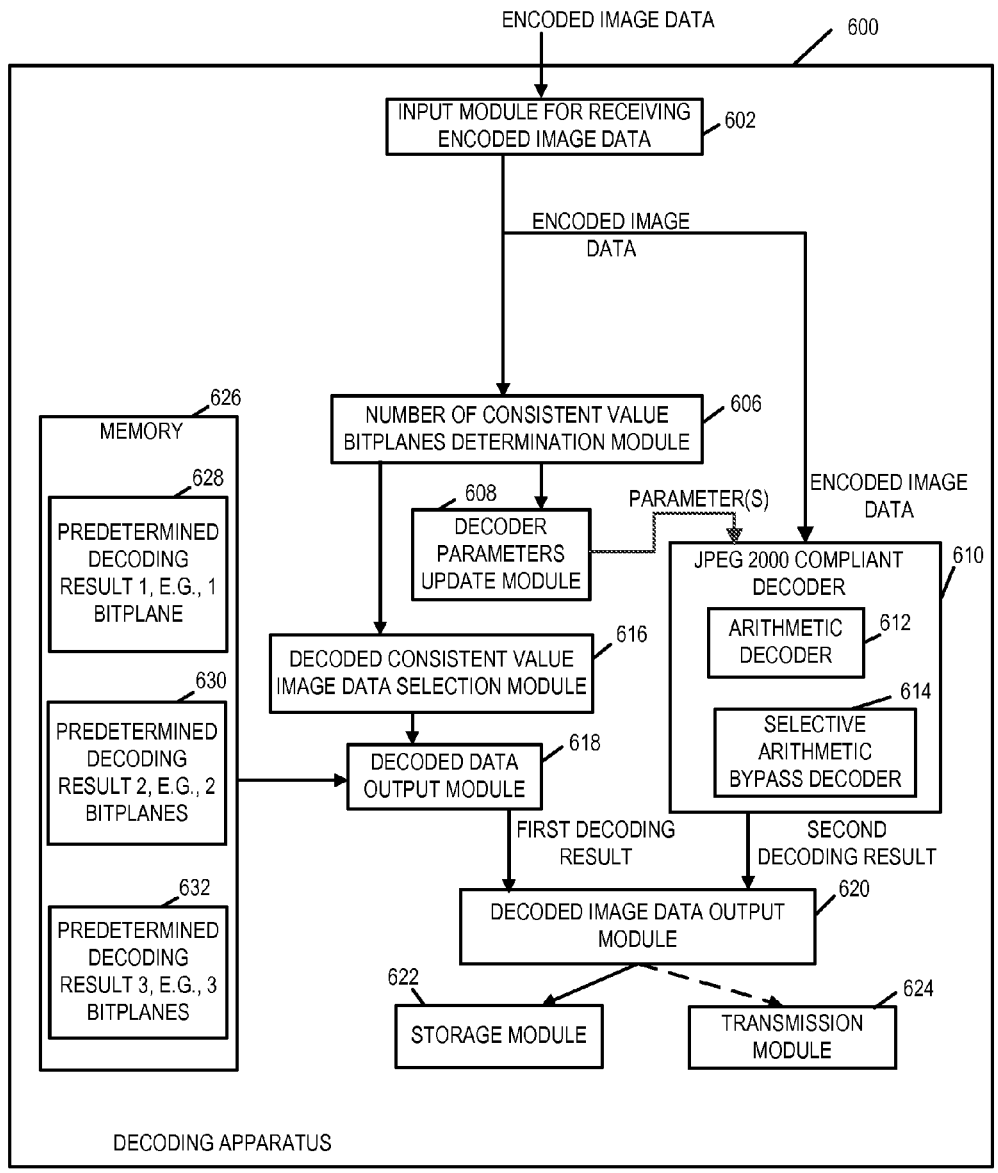
FIG. 6 illustrates an exemplary decoder implemented in accordance with one exemplary embodiment.

FIG. 6 illustrates an exemplary decoder apparatus 600 implemented in accordance with one exemplary embodiment. The decoder 600 includes an input module 602 for receiving encoded image data. The received encoded image data may include image data corresponding to multiple codeblocks, e.g., with encoded image data corresponding to different codeblocks being processed on a codeblock by codeblock basis. The input module 602 outputs encoded image data corresponding to individual codeblocks, e.g., sequentially, for processing. The encoded image data is supplied to both modules 606 and 610. Module 606 is a number of consistent value bitsplanes determination module which determines a number, K, of consistent value bitsplanes, e.g., bitplanes including all zero values, which correspond to the first bitplanes of the codeblock to be decoded. In various embodiments, the number K of consistent value bitplanes which may have been encoded in accordance with one embodiment, may be zero one, two, three. The number of consistent value bitplanes determination module 606 checks information in the encoded bitstream, e.g., coding interval and/or other information, to determine which one of the possible number of consistent value bitplane could have produced the received encoded bitstream. The one of the possible numbers of encoded consistent value bitplanes which could have produced the received encoded data is determined as the number K of consistent value bitplanes which are communicated by the encoded image data.

The determined number K of consistent value bitplanes represented by the encoded image data is communicated to the decoded consistent value image data selection module 616 and to the decoder parameter updating module 608.

The decoded consistent value image data selection module 616 controls the memory 626 to output one of a plurality of predetermined sets of decoding results 628, 630, 632 when the number K is non-zero. For example, when K is one indicating that a single consistent value bit plane is to be included in decoded image data output, decoding result 628 which includes consistent values corresponding to a single bitplane is output. When K is 2, predetermined decoding result 630 including consistent bitplane values, e.g., zero values, corresponding to two bitplanes is output. Similarly, when K is 3, predetermined decoding result 632 including consistent bitplane values, e.g., zero values, corresponding to three bitplanes is output.

While the predetermined decoding results corresponding to the various predetermined numbers of consistent value bitplanes which may be encoded at the start of a codeblock may be stored and output from memory, the consistent values may also be generated in real time. In one such embodiment decoded consistent value image data selection module is replaced by a predetermined decoding result generation module which outputs, in response to the input K, the number of bitplane values, corresponding to the indicated number of bitplanes, where the output bitplane values are the same consistent value, e.g., zero. In one such embodiments the predetermined decoding result generation module generates K times N zero values where N is the number of bitplane values in a bitplane.

The decoded consistent value image data retrieved from memory or generated in response to the control value K, is supplied to decoded data output module 618 which supplies the bitplane values to the decoded image data output module 620 to be included with additional decoded image data, if any, produced by the JPEG 2000 compliant decoder module 610.

The number K of consistent value bitplanes determined by module 606 to correspond to the start of the codeblock being decoded is communicated to the decoder parameters update module 608. The decoder parameter update module 608 generates various decoder control parameters reflecting that K consistent value bitplanes have been decoded. The control parameters are supplied to a parameter input of the JPEG 2000 Compliant decoder 610 which is responsible for decoding additional encoded image data, if any, corresponding to the codeblock being decoded. In some embodiments updating the state of the decoder 610 which is performed by decoder parameters update module 608, includes setting a decoder state, e.g., one or more decoder control parameters, to a state that corresponds to having decided the K consistent value bitplanes. Updating the state of a decoder 610 includes, in some embodiments, setting a parameter used to control said decoder, to the number K indicating the number of bitplanes which have already been decoded. Thus the JPEG 2000 compliant decoder module 610 is aware of the starting point, e.g., the K+1 bitplane, within a codeblock at which decoding by the decoder module 610 is to commence.

The JPEG 2000 Compliant decoder 610 includes an arithmetic decoder 612 and a selective arithmetic bypass decoder 614 which operate in a JPEG-2000 compliant manner, e.g., to decode one or more encoded bitplanes, when they are present.

The JPEG 2000 compliant decoder is able to skip the P bitplanes thereby reducing processing time when P is non-zero. The decoded image data generated by the JPEG 2000 compliant decoder 610 represents a second decoding result corresponding to the codeblock being processed at a given point in time with the output corresponding to the P consistent value bitplanes being a first decoding result. The first and second decoding results are procecessed by decoded image data output module 620 and arranged in an image file or bitstream communicating decoded image data. Module 620 may add formatting information, headers and/or other information useful for interpreting and displaying the decoded image data. Module 620 may combine decoded image data corresponding to multiple codeblocks to produce the output bitstream or file. The output bitstream or file is sent to storage module 622 for storage or to transmission module 624 for transmission, e.g., over a communications network or other communications link to a display device.

Using the above described methods and apparatus, the number of consistent value bitplanes corresponding to the beginning portion of a codeblock represented by encoded image data to be decoded can be determined and rapidly output without the need for performing a full JPEG 2000 compliant decoding operation to generate the decoded values corresponding to the consistent value bitplanes at the start of a codeblock. The JPEG 2000 decoder can be used to decode the additional encoded bitplanes but by allowing the JPEG 2000 compliant decoder to skip some of bitplanes, e.g., the first P bitplanes, decoding is expedited as compared to a system where the JPEG 2000 decoder generated all the bitplane values of a decoded image.

Figure 7:
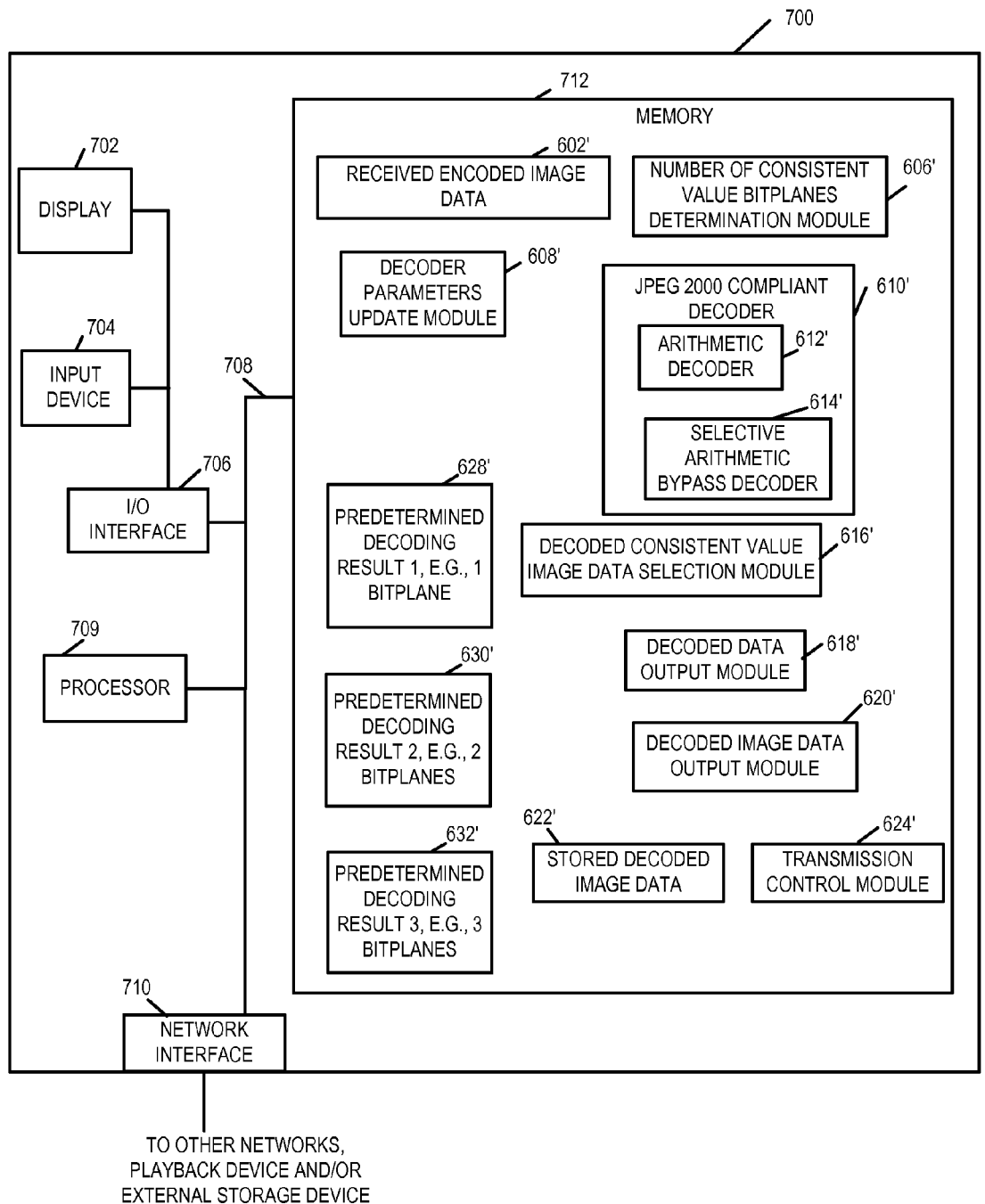
FIG. 7 illustrates an exemplary decoder, implemented using software modules stored on a non-transitory computer readable medium and a computer processor, that can be used to perform decoding of encoded image data in accordance with the invention.

FIG. 7 illustrates an exemplary decoder 700, implemented using software modules stored on a non-transitory computer readable memory 712 and a computer processor 709, that can be used to perform decoding of encoded image data in accordance with the invention. The decoder system 700 includes a display 702, an input device 704, processor 709 a network interface 710 and memory 700. The memory includes various modules which when executed by the processor 709, control the processor to perform the same or similar operations as performed by the similarly numbered element of FIG. 6. Note that a prime is used to distinguish between the software module shown in FIG. 7 and the corresponding module, e.g., hardware module, shown in FIG. 6. For example, in FIG. 7 decoder parameters update module 608' performs the same or similar function as decoder parameters update module 616 shown in FIG. 6. Given that the functions of the various modules have already been described with regard to the FIG. 6 embodiment the modules shown in FIG. 7 which perform the same functions as shown in FIG. 6 will not be described again. Is should be noted however, that in the FIG. 7 embodiment the network interface 710 severs as a bi-direction interface allowing the receipt of encoded image data and the output, e.g., transmission of decoded image data generated in accordance with the invention. Received encoded image data may be stored in a portion of memory 705 while it waits to be processed while decoded image data may be stored in another potion of memory, e.g., portion 707.

Various embodiments are directed to a non-transitory computer readable medium, e.g., memory 712, comprising or having stored thereon computer executable instructions, e.g., instructions corresponding to the various software modules shown in FIG. 7, for controlling a computer or processor, e.g., processor 709, to decode image data in accordance with the present invention. Thus, in some embodiments, the computer readable medium includes instructions for controlling the decoder 700 to perform each of the steps shown and described in regard to FIG. 6.

The techniques of various embodiments may be implemented using software, hardware and/or a combination of software and hardware. Various embodiments are directed to apparatus, e.g., a video data processing system. Various embodiments are also directed to methods, e.g., a method of processing video data. Various embodiments are also directed to machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A method of decoding entropy encoded image data including one or more entropy encoded consistent value bitplanes, the method comprising:
   determining, based on arithmetic coding interval size and position communicated in a bitstream with the entropy encoded image data, a number K of consecutive consistent value bitplanes which could have produced the entropy encoded image data from the entropy encoded image data including the one or more entropy encoded consistent value bitplanes, K being an integer value;
   outputting as decoded image data predetermined values corresponding to K consistent value bitplanes;
   updating the state of an entropy decoder to indicate the output of decoded image data corresponding to K consistent value bitplanes; and
   starting decoding of bitplanes by said entropy decoder beginning at a K+1 bitplane of said entropy encoded image data, said entropy decoder skipping decoding of the K consistent value bitplanes.

2. The method of claim 1,
   wherein said predetermined values are zero values.

3. The method of claim 1, wherein said consistent value bitplanes are bitplanes where all the values in the bitplane are zero.

4. The method of claim 1,
   wherein determining a number K of consecutive consistent value bitplanes which could have produced the entropy encoded image data includes:
   predicting the number K from the arithmetic coding interval information included in the bitstream and knowledge that the entropy encoded image data of the codeblock will include a number of consecutive consistent values.

5. The method of claim 4, wherein said predicting is further based on knowledge that arithmetic coding was used to produce said entropy encoded image data.

6. The method of claim 1, further comprising:
   if K is less than a predetermined number F then performing a first type decoding operation on at least some bitplane data included in said entropy encoded image data to generate bitplane values for F-K bitplanes of said decoded image data.

7. The method of claim 6, wherein F is 3.

8. The method of claim 6, wherein said first type decoding operation is an arithmetic decoding operation.

9. The method of claim 6,
   wherein said decoder is an arithmetic decoder; and
   wherein performing a first type decoding operation includes performing an arithmetic decoding operation.

10. The method of claim 6, further comprising:
generating additional decoded image data from data included in said entropy encoded image data by performing a second type decoding operation, said additional decoded image data including bitplane values corresponding to at least one additional bitplane of said entropy encoded image data of the codeblock.

11. The method of claim 10, wherein said decoded image data includes a set of bitplane values for each of a plurality of different bitplanes of a JPEG-2000 codeblock.

12. The method of claim 10, wherein said second type decoding operation is an entropy decoding operation.

13. The method of claim 11,
wherein said second type decoding operation is implemented using a JPEG 2000 compliant selective arithmetic bypass decoding process.

14. The method of claim 11, wherein said first type decoding operation is a JPEG 2000 compliant arithmetic decoding process.

15. The method of claim 1, wherein updating the state of the entropy decoder includes setting decoder state to a state corresponding to successful decoding of K consistent value bitplanes of entropy encoded image data.

16. The method of claim 1, wherein updating the state of a decoder includes setting a parameter used to control said decoder based on the number K which indicates a number of bitplanes of entropy encoded image data which have already been decoded.

17. The method of claim 3, wherein said entropy encoded image data is JPEG-2000 compliant entropy encoded image data.

18. An apparatus for decoding entropy encoded image data including one or more entropy encoded consistent value bitplanes, the apparatus comprising:
a module for determining, based on arithmetic coding interval size and position communicated in a bitstream with the entropy encoded image data, a number K of consecutive consistent value bitplanes which could have produced the entropy encoded image data including one or more entropy encoded consistent value bitplanes, K being an integer value;
a module for outputting as decoded image data predetermined values corresponding to K consistent value bitplanes of said entropy encoded image data; and
a module for updating the state of an entropy decoder to indicate the output of decoded image data corresponding to K consistent value bitplanes of entropy encoded image data.

19. The apparatus of claim 18, further comprising:
memory for storing said encoded image data;
a processor; and
wherein the transformed image data included in said entropy encoded image data includes wavelet coefficients.

20. A method of decoding entropy encoded image data including one or more entropy encoded consistent value bitplanes, the method comprising:
determining a number K of consecutive consistent value bitplanes which could have produced the entropy encoded image data image ma e data including the one or more entropy encoded consistent value bitplanes, K being an integer value;
outputting as decoded image data predetermined values corresponding to K consistent value bitplanes;
updating the state of an entropy decoder to indicate the output of decoded image data corresponding to K consistent value bitplanes; and
starting decoding of bitplanes by said entropy decoder beginning at a K+1 bitplane of said entropy encoded image data, said entropy decoder skipping decoding of the K consistent value bitplanes;
wherein determining a number K of consecutive consistent value bitplanes which could have produced the entropy encoded image data includes:
determining from the start of the entropy encoded image data a number Z of consistent value bits said entropy encoded image data would decode to; and
determining said number K as follows:
K=floor(Z/C), where C is the integer number of bits required to encode a consistent value bitplane, and floor is a function which provides the largest integer number smaller or equal to its argument.

21. A non-transitory computer readable medium comprising computer executable instructions, said computer executable instructions including:
code for controlling a computer to determine, based on arithmetic coding interval size and position communicated in a bitstream with the entropy encoded image data, a number K of consecutive consistent value bitplanes which could have produced the entropy encoded image data including one or more entropy encoded consistent value bitplanes, K being an integer value;
code for controlling the computer to output as decoded image data predetermined values corresponding to K consistent value bitplanes of said entropy encoded image data; and
code for controlling the computer to update the state of an entropy decoder to indicate the output of decoded image data corresponding to K consistent value bitplanes.

* * * * *